Patented Aug. 9, 1932

1,870,472

UNITED STATES PATENT OFFICE

WILLIAM E. STOKES, OF ROCKVILLE CENTER, AND ARNOLD H. PETER, OF NEW YORK, N. Y., ASSIGNORS TO ROYAL BAKING POWDER COMPANY, OF NEW YORK, N. Y., A CORPORATION OF NEW JERSEY

CONVERSION OF CARBOHYDRATES TO PRODUCTS OF HIGHER OXIDATION

No Drawing. Application filed December 21, 1925. Serial No. 76,914.

The invention relates to the conversion of carbohydrates to obtain substances of higher oxygen content, and has for its object providing a process whereby such conversion may be accomplished with better yields and more certain results than heretofore obtained.

The invention has been developed particularly in connection with the conversion of starch to tartaric substances. It has been applied also to the conversion of dextrose, maltose and cane sugar to tartrate substances and to the oxidation of other carbohydrates, such as cellulose in the form of sawdust.

The formation of small quantities of tartrate substances in the oxidation of carbohydrates by means of nitric acid was observed long ago; and there have been several suggestions of methods and expedients designed to give practical effect to that observation. The methods and expedients heretofore suggested result in the uncertain production of tartrate substances with small quantities of tartrate substances with other substances such as saccharic and, more particularly, oxalic substances, so that the commercial oxidation of carbohydrates has not been feasible. By the method and expedients hereinafter described carbohydrates may be oxidized without obtaining oxalic acid, with little, if any, saccharic acid, and with yields of tartaric acid sufficent for commercial success.

The invention comprises the discovery that the introduction of a large quantity of manganese chloride into a mixture of carbohydrate, nitric acid and water results in obtaining materially different results. The explanation of the observed phenomena is obscure. The fact that the results are not obtained by the introduction of the manganese chloride in catalytic quantities indicates that the action is not catalytic, as does the fact that the introduction of sundry catalyzers does not produce the same results. Certain observations suggest that the manganese chloride may retard or inhibit the formation of oxalic acid and, in somewhat less degree, saccharic acid, thus permitting the increased development of tartaric acid. But, pending further research, we avoid attempting any explanation. The preferred method of practicing the invention is as follows:—

Carbohydrate, water, nitric acid and manganese chloride are brought together. Desirable proportions are 100 parts starch, 100 parts water and 100 parts nitric acid, and 20 parts manganese chloride. Strong acid is to be preferred to dilute acid; and acid is preferably added in successive portions to avoid too active reaction and under conditions hereinafter recited. The quantity of manganese chloride may vary within wide limits. We have found that if, instead of 20 parts, 3 parts are used oxalic acid, saccharic acid, and tartaric acid are obtained; with 10 parts there is no oxalic acid but saccharic and tartaric; when the amount is further increased there is no oxalic and much less interference from saccharic; and further increases, up to 50 parts, seem to produce substantially the same results as about 20 parts.

These substances are preferably allowed to stand at about room temperature until the mixture becomes thin. Then they are heated, preferably with stirring, to about 90° C. At about that temperature the reaction starts and the heat may then be discontinued. Within a short time thereafter, about 10 to 15 minutes, the mixture assumes a darker color. Then 100 parts more of nitric acid are added and the mixture again heated to about 90° C. The color again turns darker within half an hour to an hour. Then 100 parts more of nitric acid are added and the mixture is heated to about 40° to 50°, at which temperature it is kept for 40 to 50 hours.

The subsequent treatment depends largely upon the form in which it is desired to obtain the tartrate substance. If cream of tartar is sought, one treatment is to dilute the mixture with water, neutralize with an alkali, as potassium carbonate, filter off the manganese hydrate precipitated thereby and add acetic acid. If tartaric acid is desired soda-ash may be added until the mixture is alkaline, and aftter boiling and filtering off the manganese hydrate calcium chloride may be added to form calcium tartrate, which may be filtered off and decomposed as usual to get tartaric acid.

It will be understood that other carbohydrates may be substituted for starch in the illustration given, and the relative proportions may be much varied. Weaker acid may also be employed, particularly if accompanied by increase in temperature in the earlier stages. But the process, substantially as recited in the illustration, has been found to give as good results as any variations of it thus far tried, and somewhat better results than those obtained from some variations.

We claim:—

1. A process for the conversion of carbohydrates to products of higher oxidation, comprising bringing together carbohydrate and nitric acid in an amount less than that required for the oxidation, and manganese chloride in an amount sufficient to inhibit the formation of oxalic acid, heating the mixture until reaction starts and allowing its ingredients to react, adding nitric acid, heating until reaction again starts, and allowing further oxidation therewith, then adding more nitric acid, and maintaining the mixture at a temperature above room temperature and below the starting temperature of the reaction.

2. A process for the oxidation of carbohydrates, comprising heating a mixture containing nitric acid in an amount theoretically less than that required for the oxidation of the carbohydrate, a compound containing manganese in an amount sufficient to inhibit the formation of oxalic acid and the carbohydrate to be oxidized until reaction starts, and subsequently adding more nitric acid, and maintaining the mixture at a temperature above room temperature and below the temperature used to start the reaction.

3. A process for converting a carbohyrate to a product of higher oxidation, comprising causing a carbohydrate and nitric acid to react in the presence of a quantity of manganese containing compound equal to about 20% by weight of the carbohydrate.

4. A process for the conversion of a carbohydrate to a product of higher oxidation, comprising causing a carbohydrate and nitric acid to react in the presence of an amount of manganese chloride exceeding 3% by weight of the carbohydrate.

5. A process for the conversion of a carbohydrate to a product of higher oxidation, comprising causing a carbohydrate and nitric acid to react in the presence of an amount of manganese-containing compound exceeding 10% by weight of the carbohydrate.

6. A process for oxidizing a carbohydrate, which comprises treating a carbohydrate with nitric acid in the presence of an amount of manganese chloride exceeding 10% by weight of the substance to be oxidized.

7. A process for converting a carbohydrate to a product of higher oxidation which consists in oxidizing a carbohydrate with nitric acid in the presence of a quantity of a manganese containing compound exceeding 3% by weight of the carbohydrate.

8. A process for converting a carbohydrate to a product of higher oxidation which comprises oxidizing a carbohydrate with nitric acid in the presence of a quantity of manganese chloride equal to about 20% by weight of the carbohydrate.

9. A process for converting a carbohydrate to a product of higher oxidation which consists in oxidizing a starch with nitric acid in the presence of an amount of a manganese containing compound exceeding 3% by weight of the carbohydrate.

10. A process for converting a carbohydrate to a product of higher oxidation which comprises reacting one part of a carbohydrate with one part nitric acid and one part of water in the presence of .2 part of a compound containing manganese.

11. A process for converting a carbohydrate to a product of higher oxidation which comprises reacting a mixture containing one part starch, one part of water, one part of nitric acid and .2 part of manganese chloride under the influence of heat, then adding one part nitric acid and again reacting under the influence of heat and subsequently adding one part of nitric acid and maintaining the reaction mixture at a temperature above room temperature and below the starting temperature of the reaction.

12. A process for converting a carbohydrate to a product of higher oxidation which comprises mixing one part of starch, one part water and one part nitric acid and .2 part of manganese chloride, heating to about 90° C., allowing the mixture to react, then adding one part of nitric acid and again heating to 90° C. and allowing the mixture to react and subsequently adding one part of nitric acid and heating the mixture to a temperature of from 40° to 50° C. for a period of several hours.

13. A process for the oxidation of carbohydrates, which comprises heating a mixture consisting of nitric acid, a compound containing manganese in an amount sufficient to inhibit the formation of oxalic acid, and the carbohydrate to be oxidized, until reaction starts, and subsequently maintaining the mixture at a temperature above room temperature and below the starting temperature of the reaction.

14. A process for the oxidation of carbohydrates, which comprises treating a carbohydrate with nitric acid in the presence of an amount of manganese chloride sufficient to inhibit the formation of oxalic acid.

15. A process for the oxidation of carbohydrates, which comprises treating a starch with nitric acid in the presence of an amount of manganese chloride sufficient to inhibit the formation of oxalic acid.

16. A process for the oxidation of carbohydrates, which comprises reacting a carbohydrate with nitric acid solely in the presence of an amount of a manganese-containing compound sufficient to inhibit the formation of oxalic acid.

WILLIAM E. STOKES.
ARNOLD H. PETER.